United States Patent [19]
Halpern

[11] 3,797,315
[45] Mar. 19, 1974

[54] REMOTE INDICATING ADJUSTABLE ANGLE INSTRUMENT

[76] Inventor: Walter J. Halpern, 1119 Crescent St., Sarasota, Fla. 33581

[22] Filed: July 6, 1972

[21] Appl. No.: 269,389

[52] U.S. Cl. .............................. 73/363.9, 73/362.1
[51] Int. Cl. ............................................. G01k 5/70
[58] Field of Search................... 73/363.9, 375, 431

[56] References Cited
UNITED STATES PATENTS

| | | | |
|---|---|---|---|
| 3,357,251 | 12/1967 | Harrison | 73/363.7 |
| 3,248,947 | 3/1966 | Weinmann | 73/375 |
| 2,866,940 | 12/1958 | Lamb | 73/431 X |
| 3,605,498 | 9/1971 | Lamb | 73/431 |

Primary Examiner—Richard C. Queisser
Assistant Examiner—Daniel M. Yasich
Attorney, Agent, or Firm—Oldham & Oldham Co.

[57] ABSTRACT

In a gauge, a case assembly and measuring assembly movable as a unit into and out of the case assembly. The case assembly includes a stem portion adapted to be secured in gauging position, a dial-receiving portion adapted to be secured in read-out position, and angular joint means adjustably securing the stem portion to the dial portion. The measuring assembly includes a bimetallic helix, a dial, a pointer and means including torque springs for moving the pointer over the dial when the helix is subjected to temperature changes. The measuring assembly when moved into the case assembly positions the helix in the stem portion, the torque springs extending through the angular joint and the dial and pointer in the dial-receiving portion, and a gear for revolving the measuring assembly to reposition the pointer on the dial.

6 Claims, 3 Drawing Figures

PATENTED MAR 19 1974 3,797,315

REMOTE INDICATING ADJUSTABLE ANGLE INSTRUMENT

This invention relates to gauges having a rotary sensing element, like a bimetallic helix, for moving a pointer over a scale, the scale being angularly adjustable with respect to the sensing element so that the scale can best be positioned for easy read-out.

Angularly adjustable scales have been proposed heretofore in thermometers, see for example, U.S. Pat. No. 3,357,251. This patent refers to inaccuracies in calibration occuring when the scale angle is changed in relation to the bimetallic helix and corrects such inaccuracies by the use of mating cam faces between two parts of an angularly adjustable casing. The mating cams must be cast or machined to close tolerances for reasons set forth in the patent, see FIGS. 9, 10 and 11. The lock means for securing the cam faces in angularly adjusted position are often tightened to cause legs of clamp to spread, varying the effects of cam follower, causing inaccuracies and are subject to loosening under vibration.

It is the general object of the invention to avoid and overcome the aforesaid objections to prior art gauges by the provision of an instrument having an angularly adjustable scale or dial wherein a hollow ball joint formed of two halves allows for the angular adjustment. The halves are of stamped sheet metal with standard tolerance requirements, and the use of cams is eliminated by obtaining a proper locus of rotation of a sensing element, such as a bimetallic helix, simply by leaving it free to move toward or from the ball joint as angular scale adjustment occurs.

Another object of the invention is to provide an improved lock between the halves of the hollow ball joint when adjusted to the desired scale or dial angle, and a union type pipe joint for revolving case and complete sensing assembly.

Another and important object of the invention is the provision of a gauge of the type described wherein the complete measuring system, including the sensing element itself and the drives from the element to the scale and pointer can be quickly and easily replaced as a complete unitary measuring assembly to adapt the gauge to the measuring operation desired.

Thus, at far less cost than a complete gauge, the present invention provides a combination wherein the complete measuring system from sensing element to dial and pointer are provided in a plurality of ranges which are removably received in and held by only two screws in the case assembly which includes the case for the dial, hollow ball and parts and stem.

Replacement of measuring systems in the field, or in jobber's stocks, is accordingly greatly facilitated and costs reduced.

Another object of the invention is to notably simplify calibration of a measuring system as described whereby a single screw can be adjusted from the back or the front of the case to reposition the pointer on the scale.

Another object of the invention is to provide a less expensive and better instrument, as described, particularly adapted for use with bimetallic dial thermometers, but also adapted to adjustable mercury in glass thermometers and adjustable filled system dial thermometers.

Another object of the invention is an improved manner of securing a cover glass on a dial type gauge.

For a better understanding of the invention reference should be had to the drawings wherein FIG. 1 is an enlarged vertical cross-sectional view, partially broken away, of a gauge incorporating the features of the invention.

Figures 1, 2, 3:
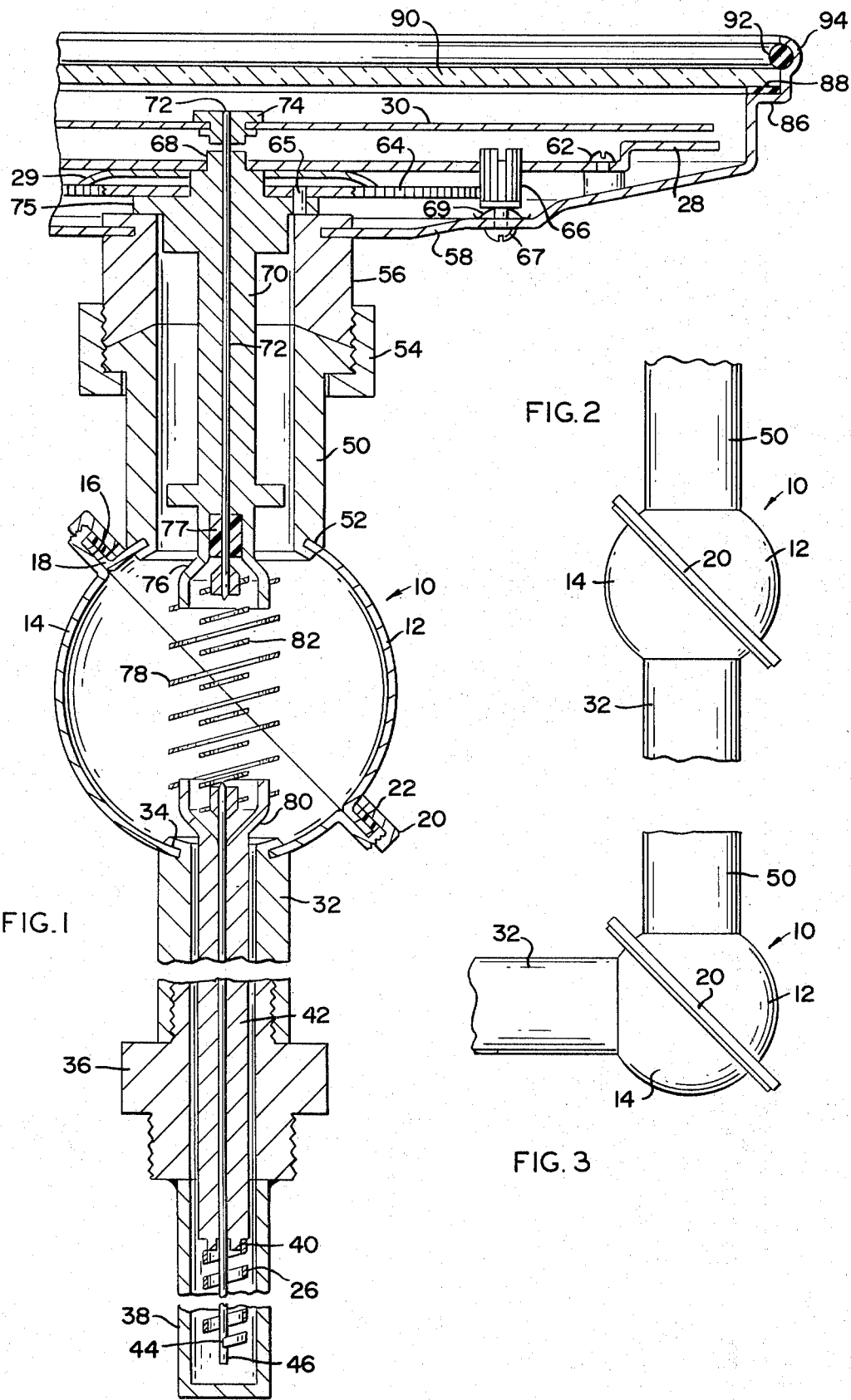
FIG. 2 is a fragmentary elevational view, on a reduced scale of FIG. 1, particularly showing the hollow ball joint allowing angular adjustment between the dial and the sensing element.
FIG. 3 is a view similar to FIG. 2 but illustrating the hollow ball joint adjusted to another angle.

In the drawings the numeral 10 indicates generally the hollow ball joint forming an important feature of the invention. The ball joint 10 is the angular joint means of the case assembly and adjustably joins the stem portion and the dial-receiving portion thereof. More specifically, the hollow ball joint 10 is formed in two halves or portions 12 and 14 each stamped from sheet metal hemi-spherical and without any necessity for very close tolerances. The portion 14 is formed with an integral circular groove 16 which receives an integral circular flange 18 formed around the portion 12. An internally threaded ring 20 screwing on portion 14 and an interposed gasket 22 quickly but releasably locks the two halves 12 and 14 of the ball joint together, like a union pipe joint, in any desired angular position. Two of such positions are shown in FIGS. 2 and 3.

The stem portion half 14 of the ball joint 10 receives a rotary sensing element, such as a bimetallic helix, indicated by the numeral 26 and the dial portion or dial-receiving half 12 mounts a scale or dial 28 and pointer 30. More particularly, a hollow stem 32 is secured at 34 to half 14. The end of the stem 32 remote from the portion 14 is counterbored and tapped and receives a mounting nut 36 to which is welded a thin-walled cylinder 38 which receives the sensing element 26. The mounting nut 36 normally secures the cylinder 38 and sensing element 26 of the stem portion 14 in a threaded opening in a tank, pipe or the like having a temperature measured or other characteristic gauged.

The rotary sensing element 26 in one well known form is a helical coil of bimetallic metals so that the coil will open or close on change of temperature. One end of the element 26 is secured at 40 to a cartridge tube 42, and the other end of the element 26 is secured at 44 to shaft 46 rotatively received in the tube 42. Note that tube 42 and shaft 46, as well as sensing element 26 are freely movable as a unit both rotatively and axially in the hollow stem 32 and cylinder 38. This design eliminates the need for expensive cams, die cast or machined to close tolerances, or any cams at all, between the portions 12 and 14 of the ball joint 10. The unit comprising the sensing element 26, shaft 46, and tube 42 automatically adjusts to a proper locus of rotation as hereinafter more specifically described.

The dial-receiving portion 12 of the ball joint 10, carrying the dial or scale 28 and pointer 30, includes a housing 50 secured at 52 to half 12. Lock nut 54 secures housing 50 in any desired rotary relation with hollow boss 56 secured to dial case 58. Scale 28 is secured to two screws 62 to case 58, compressing spring 29, and locating gear 64. The complete sensing assembly is thus fixed in relation to portion 12 of ball joint 10. Scale 28 rotatably receives a hub 68 of an extension 70, which has an axial bore rotatably carrying a stem 72 which mounts pointer 30 on a press fit bushing 74.

Extension 70 extends rotatively through housing 50, one end of the extension having an integral flange 75 resting on hollow boss 56. Extension 70 is flared at its end 76 inside ball joint 10 and is connected by helical edge wound spring means 78 (sometimes called a torque spring) to flared end 80 of tube 42. In like manner stem 72 is connected by helical edge wound spring means 82 to shaft 46. A nylon bearing 77 may be provided between extension 70 and stem 72.

In order to calibrate or zero in the pointer 30 on dial 28 a gear 64 is secured to flange 75, as by pin 65, and the gear 64 is engaged by a pinion gear 66 rotatably fastened to case 58 by a screw 67. The pinion gear 66 extends in journaled relation through scale 28, and has a dished spring washer 69 surrounding screw 67 to hold the pinion in adjusted position. The pinion gear 66 can be turned from the front by a slot in the end extending through the scale 28, or by turning the screw 67 on the back side of the case 58.

Turning the pinion gear 66, as just described, turns gear 64, extension 70, torque spring 78, tube 42, bimetal 26, shaft 46, torque spring 82, stem 72 and thus pointer 30 in relation to fixed dial 28 to zero the gauge in.

In operation, dial 28 is thus fixed on extension 70 which is connected through spring 78 and tube 42 to sensing element 26. As element 26 turns angularly due to change of temperature shaft 46 turns and operates through spring 82 to turn stem 72 connected to pointer 30 moving it angularly over dial 28.

In this manner, pointer 30 moves over dial 28 in direct response to the action of sensing element 26, and regardless of the angle to which ball joint 10 is adjusted. Torque springs 78 and 82 allow the ball joint 10 to be adjusted up to a full 90° angle. Threaded ring 20 need only be loosened and ball halves 12 and 14 turned relative to each other, and the ring 20 retightened. This construction is like a union pipe connection, and is readily operated and free of distortion.

During any angular readjustment of the ball joint 10 the tube 42, shaft 46, and sensing element 26 moves freely as a unit in an axial direction in and out of stem 32 so that the locus of rotation of springs 78 and 82 is such as to maintain proper calibration between sensing element 26 and pointer 30. There is no need for expensive cam means in the ball joint.

The 90° adjustment of the ball joint 10, as just described, plus loosening of lock nut 54 and 360° rotation of case 58 allows the dial 30 to be positioned in the best possible viewing position in any given installation.

The case 58 is formed with a circular shelf 86 carrying a gasket 88 against which a cover glass 90 rests. The glass 90 is releasably held in position by a split lock ring 92 expanding outwardly into a half round groove 94 integrally formed in the case 58 at the outer edge of the shelf 86. Thus, a separate bezel for holding the cover glass on the case is eliminated, thereby making the case 58 easier to turn to position the scale or dial 30 as desired.

An important feature of the invention is that the entire measuring assembly, heretofore sometimes called measuring system, can be very quickly replaced in the gauge. The measuring assembly comprises sensing element 26, tube 42, shaft 46, springs 78 and 82, stem 72, extension 70, gear 64, scale 28, bushing 74, pointer 30 and spring 29. With the parts 12 and 14 of the ball joint 10 straight away as seen in FIGS. 1 and 2, it is only necessary to remove cover glass 90 from case 58, and remove the two screws 62 fastening scale 28 to case 58. Now the entire measuring assembly can be lifted out and replaced. The user of the gauge need not have a plurality of different gauges, but can simply stock a plurality of different measuring assemblys, should he find it advisable to change the limits or character of the gauging operation. Of course, a plurality of the case assemblies, also, can be stocked. These comprise all parts of the gauge without the measuring assembly, i.e., measuring system therein.

While in accord with the patent statutes one embodiment of the invention has been illustrated and described in detail, it is to be understood that the scope of the invention is not to be limited thereby or thereto, but is defined in the appended claims.

What is claimed is:

1. In a gauge, a case assembly including an elongated stem portion adapted to be secured in gauging position, an elongated dial-receiving portion, and angular joint means adjustably securing the stem portion to the dial-receiving portion, and an interconnected measuring assembly including interconnected elements comprising a bimetallic helix, a dial, a pointer, and means including torque springs for moving the pointer over the dial when the helix is subjected to temperature changes, the improvement comprising the interconnected elements of the measuring assembly being movable as a unit into and out of the case assembly to position the helix in the stem portion, and to position the torque springs extending through the angular joint, and the dial and pointer in the dial-receiving portion, and means releasably holding the measuring assembly in the case assembly.

2. The combination defined in claim 1 wherein that portion of the measuring assembly extending into the stem portion of the case assembly is free to be suspended from the dial portion therein so that proper locus of rotation of the torque springs is achieved regardless of the selected angle connecting the dial-receiving portion to the stem portion of the case assembly.

3. The combination defined in claim 1 wherein the angular joint means comprises two stamped sheet metal halves forming a hollow ball joint with interlocking tongue and groove edges, a gasket between the edges, and a threaded ring securing the edges together against the gasket in any selected angular relation between the dial-receiving portion and the stem portion of the case assembly.

4. The combination defined in claim 1 wherein the dial-receiving portion includes a one-piece case having a circular shelf receiving a cover glass for the scale, the shelf having a groove adjacent to it, and a retainer ring removably received in the groove for holding the cover glass on the case.

5. The combination defined in claim 1 wherein adjusting means, accessable from both the front and the back of the dial-receiving portion, are provided for zeroing in the pointer on the dial fixed in the dial-receiving portion.

6. The combination defined in claim 1 wherein the means releasably holding the measuring assembly in the case assembly are screw means extending through the dial into the dial-receiving portion of the case assembly.

* * * * *